(12) United States Patent
Miyata (10) Patent No.: US 10,087,880 B2
(45) Date of Patent: Oct. 2, 2018

(54) ENGINE AND STRADDLED VEHICLE

(71) Applicant: YAMAHA HATSUDOKI KABUSHIKI KAISHA, Iwata-shi, Shizuoka (JP)

(72) Inventor: Manabu Miyata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 137 days.

(21) Appl. No.: 15/396,917

(22) Filed: Jan. 3, 2017

(65) Prior Publication Data

US 2017/0218881 A1    Aug. 3, 2017

(30) Foreign Application Priority Data

Jan. 29, 2016    (JP) .................................. 2016-016191

(51) Int. Cl.

| F01L 1/053 | (2006.01) |
|---|---|
| F02F 1/42 | (2006.01) |
| B62K 11/00 | (2006.01) |
| F01L 1/02 | (2006.01) |
| F02B 61/02 | (2006.01) |
| F02F 1/24 | (2006.01) |

(Continued)

(52) U.S. Cl.
CPC ............ F02F 1/4214 (2013.01); B62K 11/00 (2013.01); F01L 1/022 (2013.01); F01L 1/053 (2013.01); F02B 61/02 (2013.01); F02F 1/242 (2013.01); B60Y 2400/43 (2013.01); F01L 1/0532 (2013.01); F01L 1/143 (2013.01); *F01L 1/46* (2013.01); *F01L 2001/0537* (2013.01); *F01L 2250/02* (2013.01)

(58) Field of Classification Search
CPC . F01L 1/022; F01L 1/0532; F01L 2001/0537; F01L 1/143; F01L 1/46; F01L 2250/02
USPC .......................................... 123/90.27, 90.31
See application file for complete search history.

(56) References Cited

U.S. PATENT DOCUMENTS

| 6,182,624 B1 * | 2/2001 | Ozeki ....................... F01L 1/02 |
| | | 123/195 A |
| 6,537,115 B2 * | 3/2003 | Suganuma ............... F01M 1/02 |
| | | 123/198 C |

(Continued)

FOREIGN PATENT DOCUMENTS

| JP | 62-045307 U | 3/1987 |
| JP | 05-52104 A | 3/1993 |

(Continued)

*Primary Examiner* — Jorge Leon, Jr.
(74) *Attorney, Agent, or Firm* — Keating and Bennett, LLP (57) ABSTRACT

An intake cam is positioned between first and second shaft supports that support an intake camshaft. An exhaust cam is positioned between third and fourth shaft supports that support an exhaust camshaft. An ignition plug unit extends between the intake camshaft and the exhaust camshaft and inward of the intake cam and the exhaust cam with a cylinder axis defining a reference position. A cylinder head includes a joint plane that is joined to a cylinder body. In a case where a virtual plane is defined by the joint plane and is perpendicular or substantially perpendicular to the cylinder axis, a distance between a portion, closest to the virtual plane, of the intake camshaft and the virtual plane is less than a distance between a portion, farthest from the virtual plane, of the intake port and the virtual plane.

6 Claims, 8 Drawing Sheets

(51) Int. Cl.
  *F01L 1/46*  (2006.01)
  *F01L 1/14*  (2006.01)

(56) References Cited

U.S. PATENT DOCUMENTS

| | | | | |
|---|---|---|---|---|
| 2001/0017120 A1* | 8/2001 | Ozeki | ............ | F01L 1/02 |
| | | | | 123/196 R |
| 2002/0100443 A1* | 8/2002 | Takemura | ............ | F01L 1/143 |
| | | | | 123/90.17 |
| 2002/0134336 A1 | 9/2002 | Duesmann et al. | | |
| 2003/0019448 A1* | 1/2003 | Aoyama | ............ | F01L 1/024 |
| | | | | 123/90.16 |
| 2012/0192821 A1* | 8/2012 | Herbert | ............ | F01L 1/022 |
| | | | | 123/90.31 |
| 2013/0180487 A1* | 7/2013 | Suchecki | ............ | F01L 1/026 |
| | | | | 123/90.31 |
| 2014/0345558 A1* | 11/2014 | Miyata | ............ | F02F 1/242 |
| | | | | 123/193.3 |

FOREIGN PATENT DOCUMENTS

| | | | |
|---|---|---|---|
| JP | 07-54617 A | 2/1995 |
| JP | 2001-012225 A | 1/2001 |
| JP | 2001-349399 A | 12/2001 |
| JP | 2008-175153 A | 7/2008 |
| JP | 2010-236484 A | 10/2010 |
| JP | 2011-032925 A | 2/2011 |
| JP | 4673536 B2 | 4/2011 |
| JP | 2014-227963 A | 12/2014 |

\* cited by examiner

ENGINE AND STRADDLED VEHICLE

This application claims the benefit of priority to Japanese Patent Application No. 2016-016191 filed on Jan. 29, 2016. The entire contents of this application are hereby incorporated herein by reference.

BACKGROUND OF THE INVENTION

1. Field of the Invention

The present invention relates to an engine and a straddled vehicle.

2. Description of the Related Art

A DOHC (Double Over Head Camshaft) type engine is used as an engine required to generate a high rotation speed and high output. In the DOHC type engine described in JP 2011-32925 A, an intake-side camshaft and an exhaust-side camshaft that respectively drive an intake valve and an exhaust valve are provided. An intake-side sprocket and an exhaust-side sprocket that receive a rotational force of a crankshaft are respectively provided at one end of the intake-side camshaft and one end of the exhaust-side camshaft. The size of a cylinder head is likely to increase due to such a configuration.

It might be considered that a distance between the intake-side camshaft and the exhaust-side camshaft is reduced in order to prevent an increase in size of the above-mentioned engine. However, in the above-mentioned cylinder head, a support that rotatably supports the intake-side camshaft (hereinafter referred to as an intake-side support) and a support that rotatably supports the exhaust-side camshaft (hereinafter referred to as an exhaust-side support) are provided. Further, a plug hole through which an ignition plug is inserted is provided between the intake-side support and the exhaust-side support. Therefore, when the distance between the intake-side camshaft and the exhaust-side camshaft is reduced, the intake-side support and the exhaust-side support interfere with the ignition plug. Therefore, it is difficult to reduce the distance between the intake-side camshaft and the exhaust-side camshaft.

On the other hand, it might be considered that the intake-side camshaft and the exhaust-side camshaft are located closer to a cylinder body in order to prevent an increase in the size of the above-mentioned engine. However, an intake port and an exhaust port extending from a combustion chamber that is inclined with respect to a cylinder axis are provided in the above-mentioned cylinder head. If the distance between the intake-side camshaft and the exhaust-side camshaft cannot be reduced, a valve included angle between the intake valve and the exhaust valve cannot be reduced. In this case, when components for respectively driving the intake valve and the exhaust valve are located closer to the cylinder body, these components interfere with the intake port and the exhaust port. Therefore, it is difficult to arrange the intake-side camshaft and the exhaust-side camshaft closer to the cylinder body.

SUMMARY OF THE INVENTION

Preferred embodiments of the present invention provide an engine in which a size of a cylinder head is reduced, and a straddled vehicle including the engine.

An engine according to a preferred embodiment of the present invention includes a cylinder body, a cylinder head including an intake port and an exhaust port and that is joined to the cylinder body, first and second intake valves provided in the cylinder head that open and close the intake port, first and second exhaust valves provided in the cylinder head that open and close the exhaust port, an intake camshaft including direct-type first and second cams that respectively drive the first and second intake valves and that is provided at the cylinder head, an exhaust camshaft including direct-type third and fourth cams that respectively drive the first and second exhaust valves and that is provided at the cylinder head, first and second shaft supports that rotatably support the intake camshaft, third and fourth shaft supports that rotatably support the exhaust camshaft, a first sprocket provided at the intake camshaft, a second sprocket provided at the exhaust camshaft, a cam chain looped over the first and second sprockets, and an ignition plug unit provided in the cylinder head, wherein the intake port extends obliquely outward such that a distance between portions of the intake and exhaust ports, which are located at a same distance from the combustion chamber in a direction of a cylinder axis, gradually increases as the distance between the combustion chamber and the portion of the intake port increases in the direction of the cylinder axis, the exhaust port extends obliquely outward such that the distance between the portions of the intake and exhaust ports, which are located at the same distance from the combustion chamber in the direction of the cylinder axis, gradually increases as the distance between the combustion chamber and the portion of the exhaust port increases in the direction of the cylinder axis, the first and second cams are located between the first shaft support and the second shaft support, the third and fourth cams are located between the third shaft support and the fourth shaft support, the ignition plug unit extends through a position between the intake camshaft and the exhaust camshaft and inward of the first, second, third and fourth cams with the cylinder axis defining a reference position, the first and second sprockets are located on a same plane, are located such that a first pitch circle of the first sprocket defined by the cam chain and a second pitch circle of the second sprocket defined by the cam chain intersect with each other, and are located such that gears of the first sprocket and gears of the second sprocket do not interfere with each other, a virtual plane is defined by a joint plane of the cylinder head where the cylinder head is joined to the cylinder body, and a distance between a portion, closest to the virtual plane, of the intake camshaft and the virtual plane is less than a distance between a portion, farthest from the virtual plane, of the intake port and the virtual plane.

In the engine, the first shaft support and the second shaft support sandwich the first and second cams in a direction in which the intake camshaft extends. Further, the third shaft support and the fourth shaft support sandwich the third and fourth cams in a direction in which the exhaust camshaft extends. On the other hand, the ignition plug unit is located between the intake camshaft and the exhaust camshaft, and passes inward of the first, second, third and fourth cams with the cylinder axis defining a reference position. Thus, the first to fourth shaft supports do not interfere with the ignition plug unit between the intake camshaft and the exhaust camshaft. Therefore, the distance between the intake camshaft and the exhaust camshaft is sufficiently reduced such that the first pitch circle and the second pitch circle intersect with each other, and is sufficiently reduced such that gears of the first sprocket and gears of the second sprocket do not interfere with each other.

Because the first to fourth cams are direct-type cams, it is possible to reduce the distance between the upper end of the first intake valve and the upper end of the first exhaust valve by reducing the distance between the intake camshaft and the exhaust camshaft. Further, the distance between the upper end of the second intake valve and the upper end of the second exhaust valve is reduced. Thus, the valve included angle between the first intake valve and the first exhaust valve and the valve included angle between the second intake valve and the second exhaust valve are reduced.

In this case, components that respectively drive the first intake valve, the second intake valve, the first exhaust valve and the second exhaust valve are located closer to the cylinder axis.

In the cylinder head, the intake port extends obliquely outward such that the distance between the portions of the intake and exhaust ports, which are at the same distance from the combustion chamber in the direction of the cylinder axis, gradually increases as the distance between the combustion chamber and the portion of the intake port increases in the direction of the cylinder axis. Therefore, in the vicinity of the cylinder axis, components provided at the upper ends of the first and second intake valves are unlikely to interfere with the intake port. Therefore, the components provided at the first and second intake valves are located closer to a virtual plane. Further, the exhaust port extends obliquely outward such that the distance between the portions of the intake and exhaust ports, which are at the same distance from the combustion chamber in the direction of the cylinder axis, gradually increases as the distance between the combustion chamber and the portion of the exhaust port increases in the direction of the cylinder axis. Therefore, in the vicinity of the cylinder axis, the components provided at the upper ends of the first and second exhaust valves are unlikely to interfere with the exhaust port. Therefore, the components provided at the first and second exhaust valves are located closer to the virtual plane. Thus, the size of the cylinder head is reduced in the direction of the cylinder axis to an extent such that the distance between a portion, closest to the virtual plane, of the intake camshaft and the virtual plane is less than the distance between a portion, farthest from the virtual plane, of the intake port and the virtual plane.

As a result, an engine in which the size of the cylinder head is reduced is realized. In the above-mentioned configuration, because the first and second sprockets are located on the same plane, the common cam chain is looped over the first and second sprockets. In this case, it is not necessary to prepare a plurality of cam chains to rotate the first and second sprockets. Therefore, an increase in weight is prevented.

The engine may further include a valve lifter and a valve spring provided at each of the first intake valve, the second intake valve, the first exhaust valve and the second exhaust valve.

In this case, the valve lifter and the valve spring provided at each of the first and second intake valves are located closer to the cylinder body without interfering with the intake port. Further, the valve lifter and the valve spring provided at each of the first and second exhaust valves are located closer to the virtual plane without interfering with the exhaust port.

A valve included angle between the first intake valve and the first exhaust valve and a valve included angle between the second intake valve and the second exhaust valve preferably may be respectively about 0° or more, for example, and about 18° or less, for example.

In this case, the valve lifter and the valve spring are located closer to the virtual plane in the direction of the cylinder axis. Therefore, the intake camshaft and the exhaust camshaft are located closer to the cylinder body in the direction of the cylinder axis. As a result, the size of the engine in the direction of the cylinder axis is more sufficiently reduced.

The engine may further include a cylinder head cover attached to the cylinder head, and a guide pipe, wherein the ignition plug unit includes an ignition plug, and a plug cap connected to the ignition plug, a portion of the ignition plug and the plug cap is inserted into the guide pipe, the cylinder head includes a through hole connected to the combustion chamber, one end of the guide pipe is held in the through hole, and another end of the guide pipe is held by the cylinder head cover, a first seal is provided between an outer peripheral surface of the one end of the guide pipe and an inner peripheral surface of the through hole, a second seal is provided between an outer peripheral surface of the other end of the guide pipe and the cylinder head cover, and the guide pipe extends to a position surrounded by the first, second, third and fourth cams from the through hole.

In this case, an inner space of the guide pipe is shielded from the outside of the guide pipe, that is, an oil supply space inside of the cylinder by the first and second seals provided at the outer peripheral surface of the guide pipe. Therefore, oil is prevented from entering the guide pipe regardless of the thickness of the guide pipe. Therefore, the thickness of the guide pipe is reduced, such that the ignition plug and the plug cap are able to be inserted into the guide pipe while the distance between the intake camshaft and the exhaust camshaft is reduced. Thus, the size of the cylinder is reduced while the ignition plug and the plug cap are protected from oil with a simple configuration.

The engine preferably further includes a plurality of fixtures used to fix the intake camshaft supported by the first and second shaft supports and fix the exhaust camshaft supported by the third and fourth shaft supports, wherein the plurality of fixtures are located outward of positions surrounded by the first, second, third and fourth cams.

In this case, the plurality of fixtures are not present at positions surrounded by the first, second, third and fourth cams. Therefore, the plurality of fixtures do not interfere with the ignition plug unit between the intake camshaft and the exhaust camshaft. Therefore, the intake camshaft and the exhaust camshaft are stably supported by the first, second, third and fourth shaft supports while the distance between the intake camshaft and the exhaust camshaft is reduced.

A straddled vehicle according to another preferred embodiment of the present invention includes a drive wheel, and the engine that generates motive power to rotate the drive wheel.

The straddled vehicle includes the above-mentioned engine. Thus, a reduction in the size of the straddled vehicle is realized. Further, the straddled vehicle may be suitably used for races and the like where a high rotation speed and a high output are required.

The above and other features, elements, characteristics, and advantages of the present invention will become more apparent from the following description of preferred embodiments of the present invention with reference to the attached drawings.

DETAILED DESCRIPTION OF THE PREFERRED EMBODIMENTS

Engines and straddled vehicles including the engine according to preferred embodiments of the present invention will be described below with reference to the drawings. In the following, a motorcycle is described as one non-limiting example of the straddled vehicle.

Figure 1:
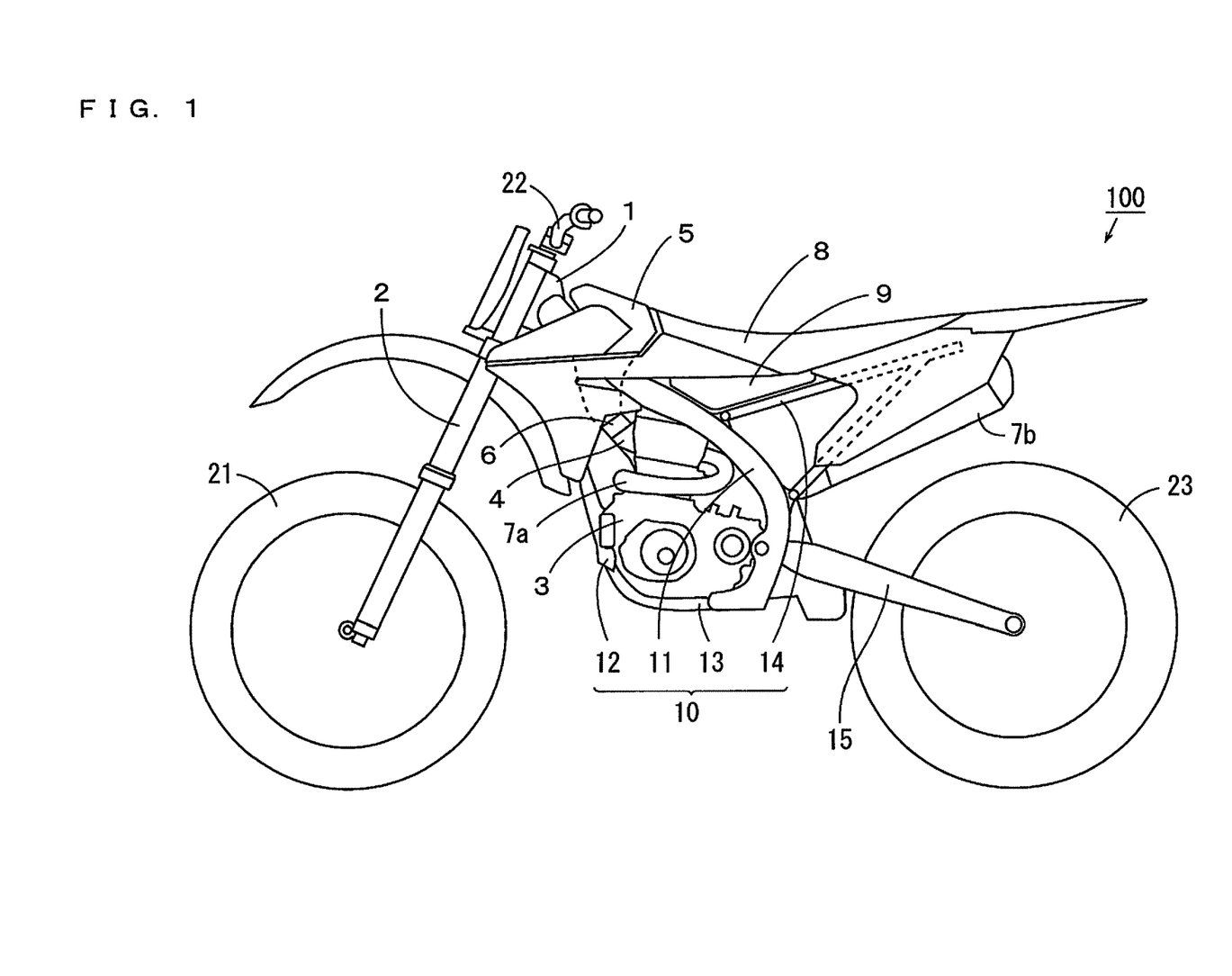
FIG. 1 is a side view of one side of a motorcycle according to a preferred embodiment of the present invention.

FIG. 1 is a side view of a side of the motorcycle according to a preferred embodiment of the present invention. As shown in FIG. 1, the motorcycle 100 includes a head pipe 1 and a body frame 10. A front fork 2 is provided at the head pipe 1 to be swingable in a left-and-right direction. A front wheel 21 is rotatably supported at the lower end of the front fork 2. A handle 22 is attached to the upper end of the front fork 2.

The body frame 10 includes a pair of left and right main frames 11, a down frame 12, a pair of left and right lower frames 13 and a pair of left and right subframes 14. In FIG. 1, only a left main frame 11, a left lower frame 13 and a left subframe 14 among the pair of main frames 11, the pair of lower frames 13 and the pair of subframes 14 are shown.

The pair of main frames 11 extend obliquely rearward and downward from the head pipe 1. The rear end of each main frame 11 is curved downward. The pair of subframes 14 respectively extend rearward and upward from upper portions of the rear ends of the pair of main frames 11.

The down frame 12 extends downward from a lower portion of the head pipe 1. The lower end of the down frame 12 branches to the left and the right. The pair of lower frames 13 extend rearward from the left and right lower ends of the down frame 12. The rear ends of the pair of lower frames 13 are respectively connected to the lower ends of the pair of main frames 11.

A single-cylinder engine 3, for example, is supported by the pair of main frames 11, the down frame 12 and the pair of lower frames 13. An air cleaner 5 is supported at a position above the engine 3 by the head pipe 1 and the pair of main frames 11.

A throttle body 4 is connected to a throttle body connector 6X of the engine 3 (FIG. 3), as described below. An intake funnel 6 connects the throttle body 4 to the air cleaner 5. One end of an exhaust pipe 7a is connected to an exhaust pipe connector 7X of the engine 3 (FIG. 3), as described below. A muffler 7B is attached to the other end of the exhaust pipe 7A.

A seat 8 extends rearward from the rear end of the air cleaner 5. A fuel tank 9 is provided at a lower portion of the seat 8. The seat 8 and the fuel tank 9 are supported by the pair of main frames 11 and the pair of subframes 14. A rear arm 15 extends rearward from the lower ends of the pair of main frames 11. A rear wheel 23 is rotatably supported at the rear end of the rear arm 15. The rear wheel 23 is rotated by motive power generated by the engine 3.

Figure 2:
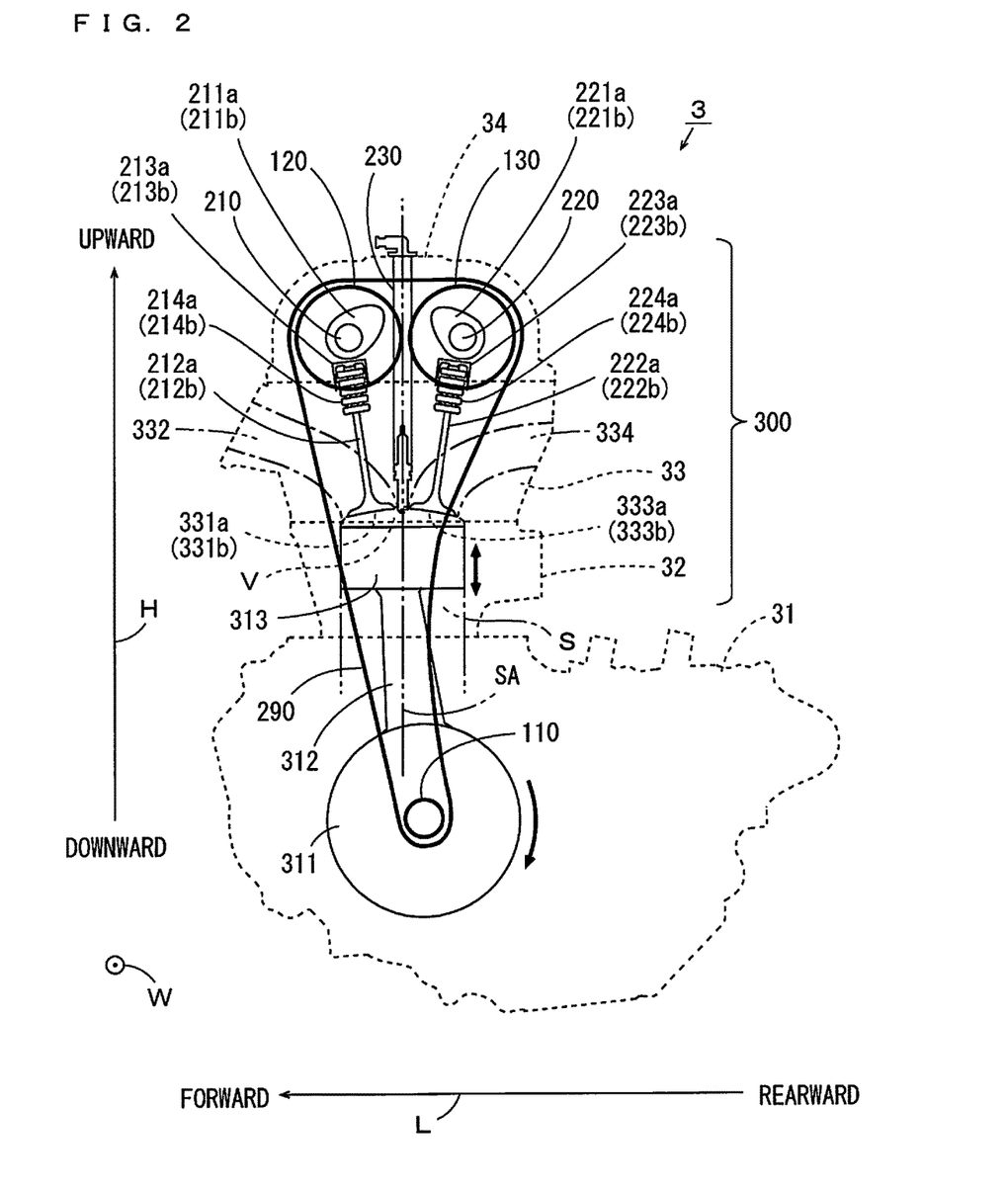
FIG. 2 is a side view of one side of an engine shown in FIG. 1.

FIG. 2 is a side view of one side of the engine 3 of FIG. 1 showing an inner configuration of the engine 3. In FIG. 2, a plurality of constituent elements in the engine 3 in the case where the motorcycle 100 of FIG. 1 is viewed from the left are indicated by solid lines. Further, in FIG. 2, an outer shape of the engine 3 is indicated by dotted lines, and a cylinder S, an intake port 332 and an exhaust port 334 in the engine 3 are indicated by one-dot and dash lines. In FIG. 2 and each of the subsequent figures, a top-and-bottom direction H, a left-and-right direction W and a front-and-rear direction L of the engine 3 are indicated by arrows.

A direction in which the arrow is directed in the front-and-rear direction L is referred to as forward, and the opposite direction is referred to as rearward. Further, a direction in which the arrow is directed in the left-and-right direction W is referred to as leftward, and the opposite direction is referred to as rightward. Further, a direction in which the arrow is directed in the top-and-bottom direction H is referred to as upward, and the opposite direction is referred to as downward. Further, a straight line passing through an axial center of the cylinder S of the engine 3 is referred to as a cylinder axis SA. In FIG. 2, the cylinder axis SA is indicated by a two-dots and dash line.

In the present preferred embodiment, the top-and-bottom direction H of the engine 3 is parallel or substantially parallel to the cylinder axis SA. The left-and-right direction W is parallel or substantially parallel to a left-and-right direction of the motorcycle 100 of FIG. 1. The front-and-rear direction L is perpendicular or substantially perpendicular to the top-and-bottom direction H and perpendicular or substantially perpendicular to the left-and-right direction W.

As shown in FIG. 2, a cylinder 300 is provided on a crankcase 31. The cylinder 300 includes a cylinder body 32, a cylinder head 33 and a cylinder head cover 34. The cylinder body 32 is joined to an upper portion of the crankcase 31. The cylinder head 33 is joined to an upper portion of the cylinder body 32. The cylinder head cover 34 is joined to an upper portion of the cylinder head 33.

In the cylinder body 32, a piston 313 is located inside of the cylinder S to be movable upward and downward. In the crankcase 31, a crankshaft 311 extends in the left-and-right direction W and is rotatably supported thereby. The piston 313 and the crankshaft 311 are connected to each other via a connecting rod 312. A crank sprocket 110 is attached to the left end of the crankshaft 311.

A combustion chamber V is provided in an upper portion of the cylinder S. In the cylinder head 33, two intake openings 331A, 331B and two exhaust openings 333A, 333B that open to the combustion chamber V are provided. The intake openings 331A, 331B are located at a position farther forward than the exhaust openings 333A, 333B. The intake openings 331A, 331B are spaced apart in the left-and-right direction W. The exhaust openings 333A, 333B are spaced apart in the left-and-right direction W.

The intake port 332 connects an inner space of the combustion chamber V to a space forward of the cylinder head 33 via the two intake openings 331A, 331B at a position farther forward than the cylinder axis SA. The exhaust port 334 connects the inner space of the combustion chamber V to a space rearward of the cylinder head 33 via the two exhaust openings 333A, 333b at a position farther rearward than the cylinder axis SA.

More specifically, the intake port 332 extends obliquely outward such that a distance between portions of the intake and exhaust ports 332, 334, which are at the same distance from the combustion chamber V in a direction of the cylinder axis SA, gradually increases as the distance between the combustion chamber V and the portion of the intake port 332 increases in the direction of the cylinder axis SA. That is, the intake port 332 extends obliquely forward and upward from the intake openings 331A, 331B. Further, the exhaust port 334 extends obliquely outward such that the distance between the portions of the intake and exhaust ports 332, 334, which are at the same distance from the combustion chamber V in the direction of the cylinder axis SA, gradually increases as the distance between the combustion chamber V and the portion of the exhaust port 334 increases in the direction of the cylinder axis SA. That is, the exhaust port 334 extends obliquely rearward and upward from the exhaust openings 333A, 333B.

An intake cam sprocket 120, an exhaust cam sprocket 130, an intake camshaft 210, intake valves 212A, 212B, an exhaust camshaft 220, exhaust valves 222A, 222B, valve lifters 213A, 213B, 223A, 223B, valve springs 214A, 214B, 224A, 224B and an ignition plug unit 230 are provided inside of the cylinder 300. The intake camshaft 210 includes direct-type intake cams 211A, 211B to respectively drive the intake valves 212A, 212B. The exhaust camshaft 220 includes direct-type exhaust cams 221A, 221B to respectively drive the exhaust valves 222A, 222B.

Figure 3:
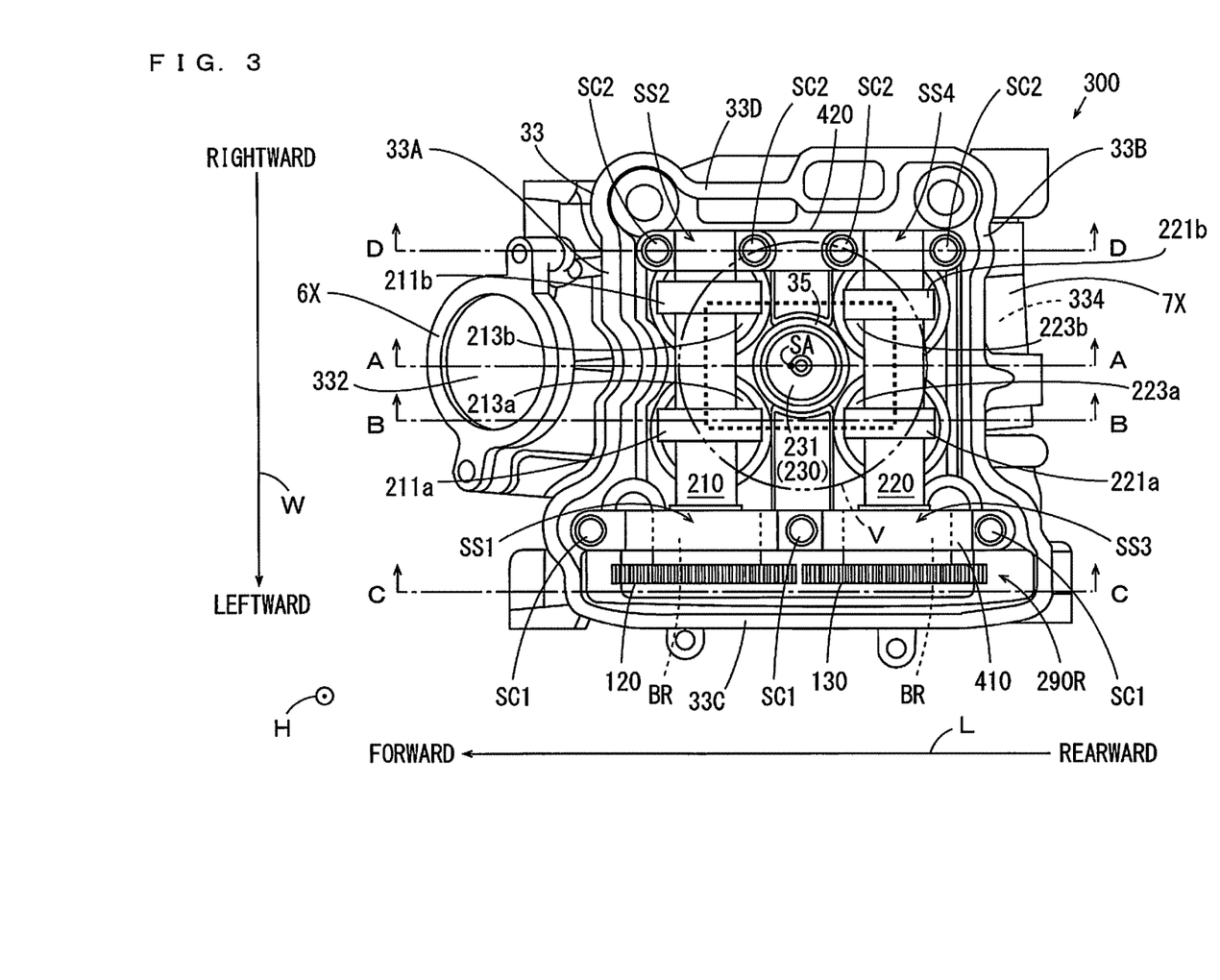
FIG. 3 is a plan view of a cylinder with a cylinder head cover removed.
Figure 4:
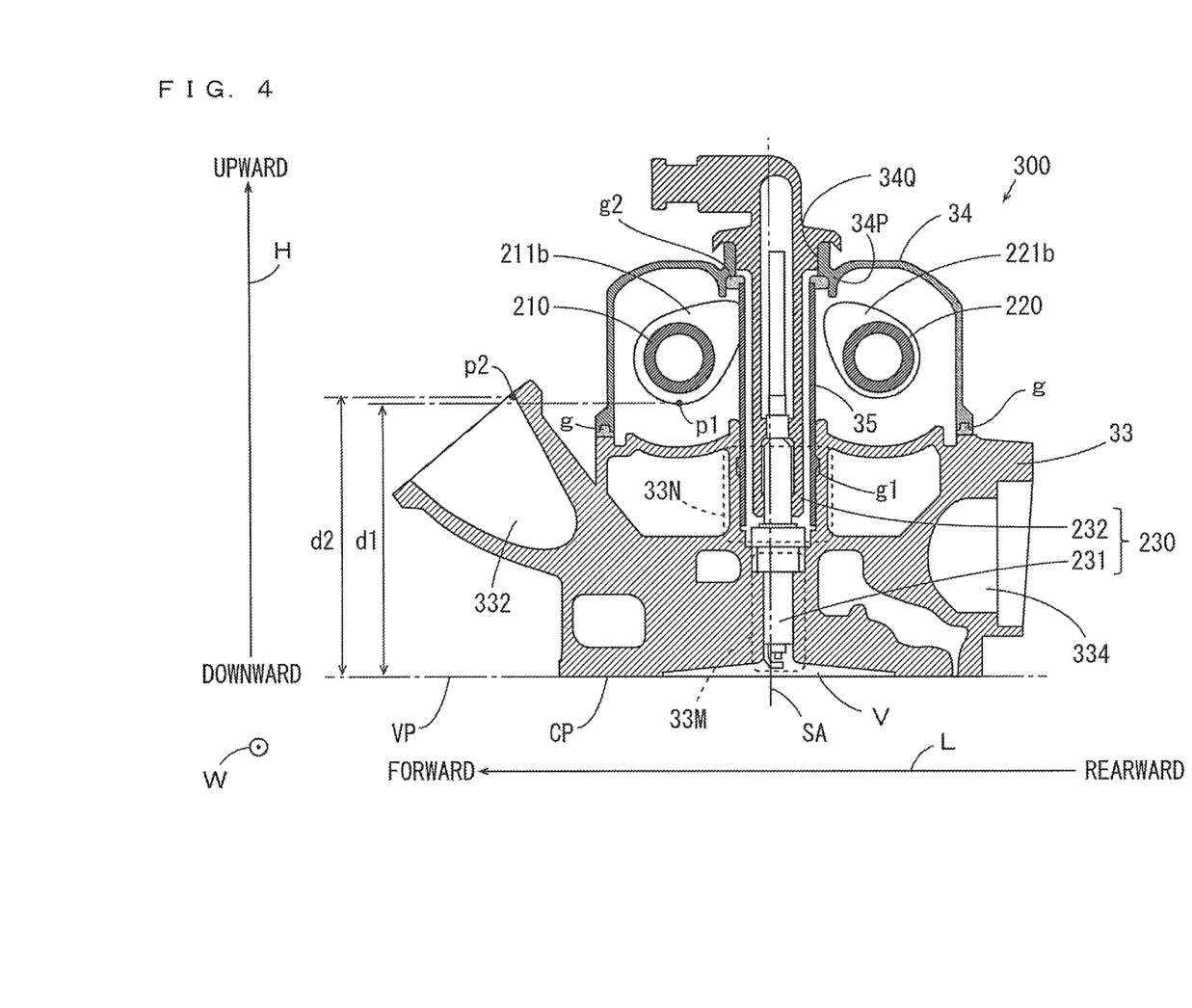
FIG. 4 is a longitudinal cross sectional view of the cylinder taken along the line A-A of FIG. 3.
Figure 5:
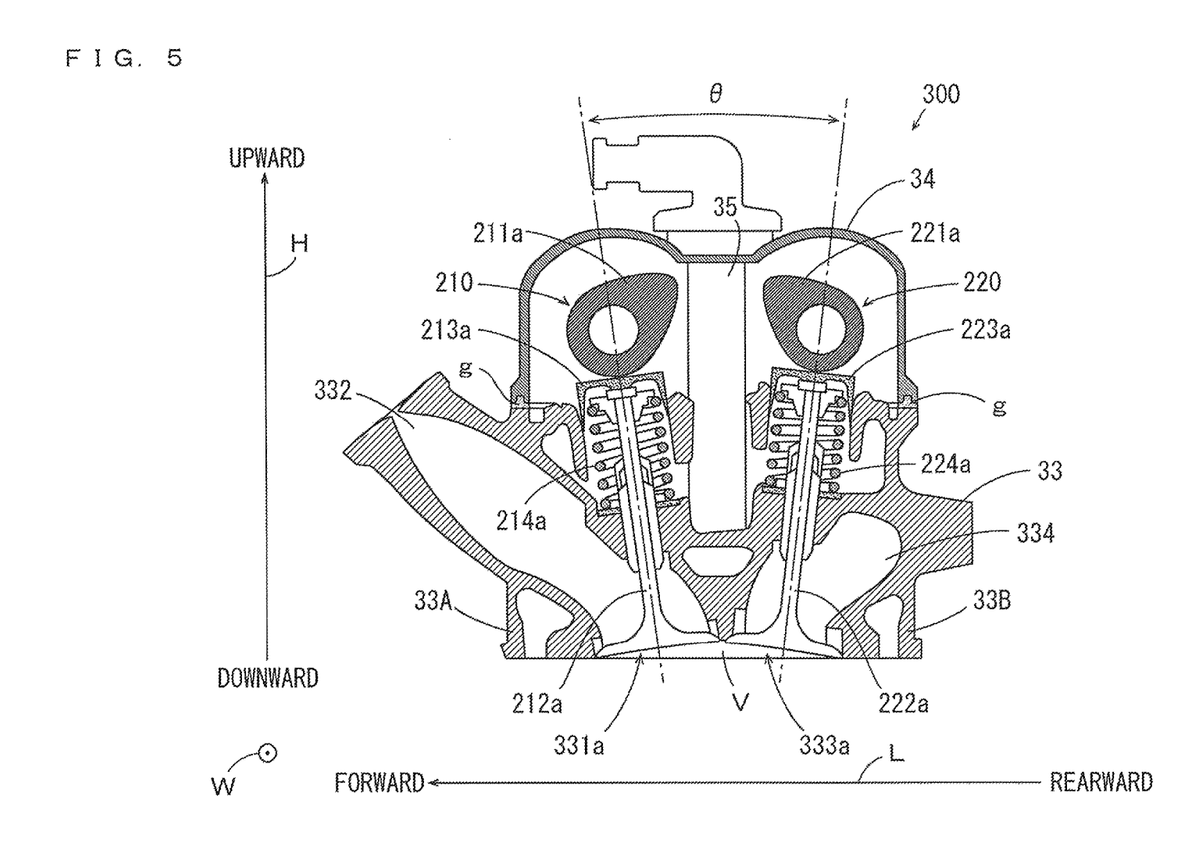
FIG. 5 is a longitudinal cross sectional view of the cylinder taken along the line B-B of FIG. 3.
Figure 6:
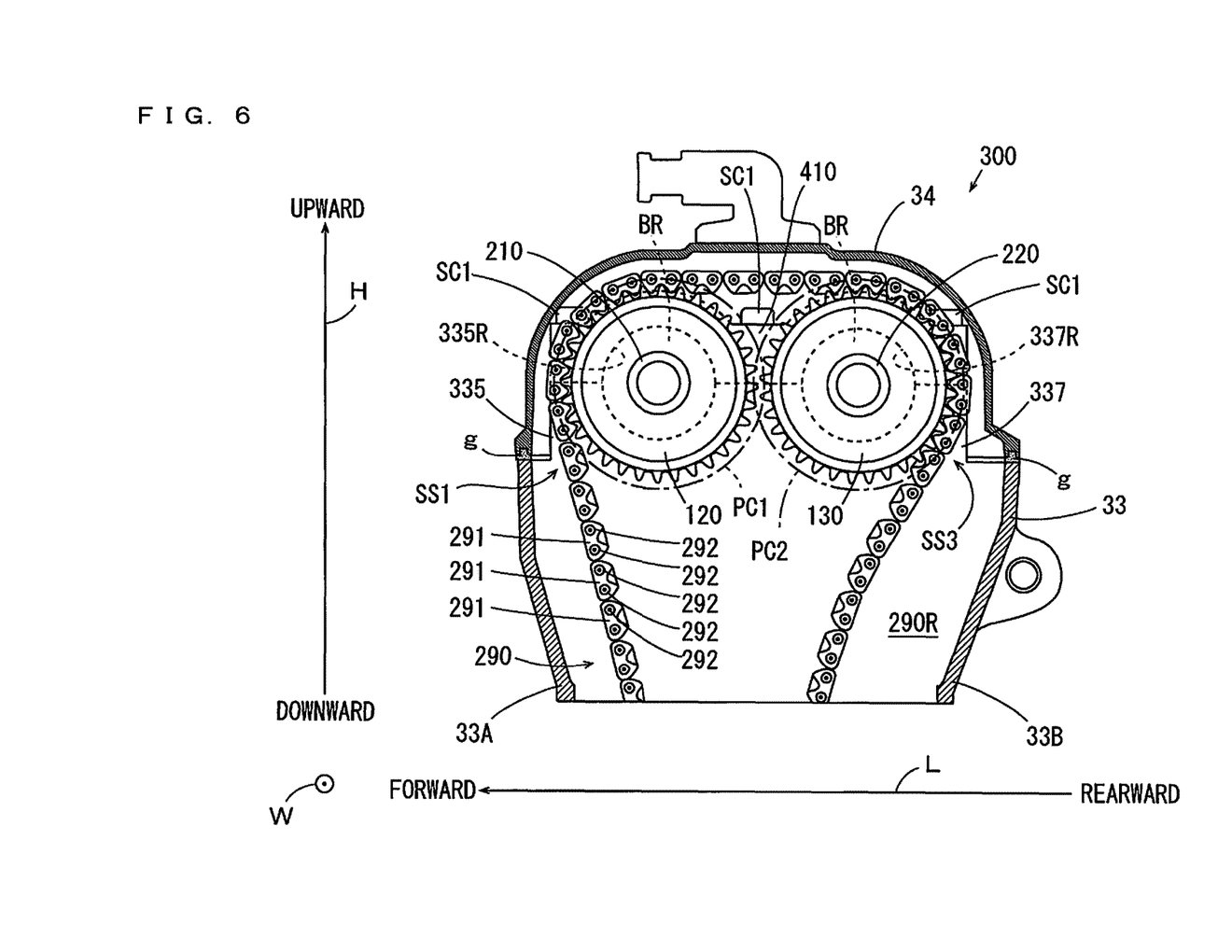
FIG. 6 is a longitudinal cross sectional view of the cylinder taken along the line C-C of FIG. 3.
Figure 7:
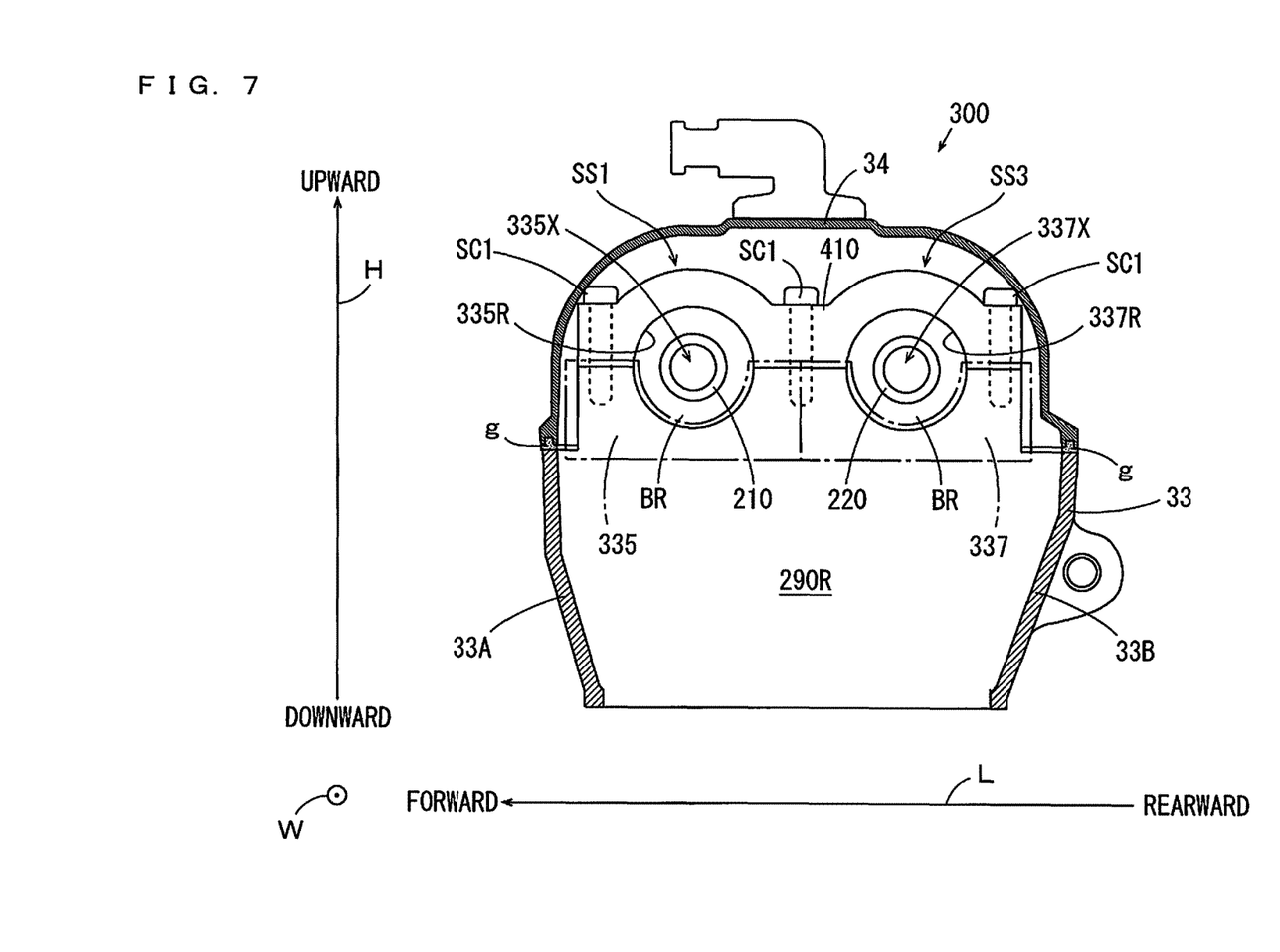
FIG. 7 is a longitudinal cross sectional view of the cylinder taken along the line C-C of FIG. 3.
Figure 8:
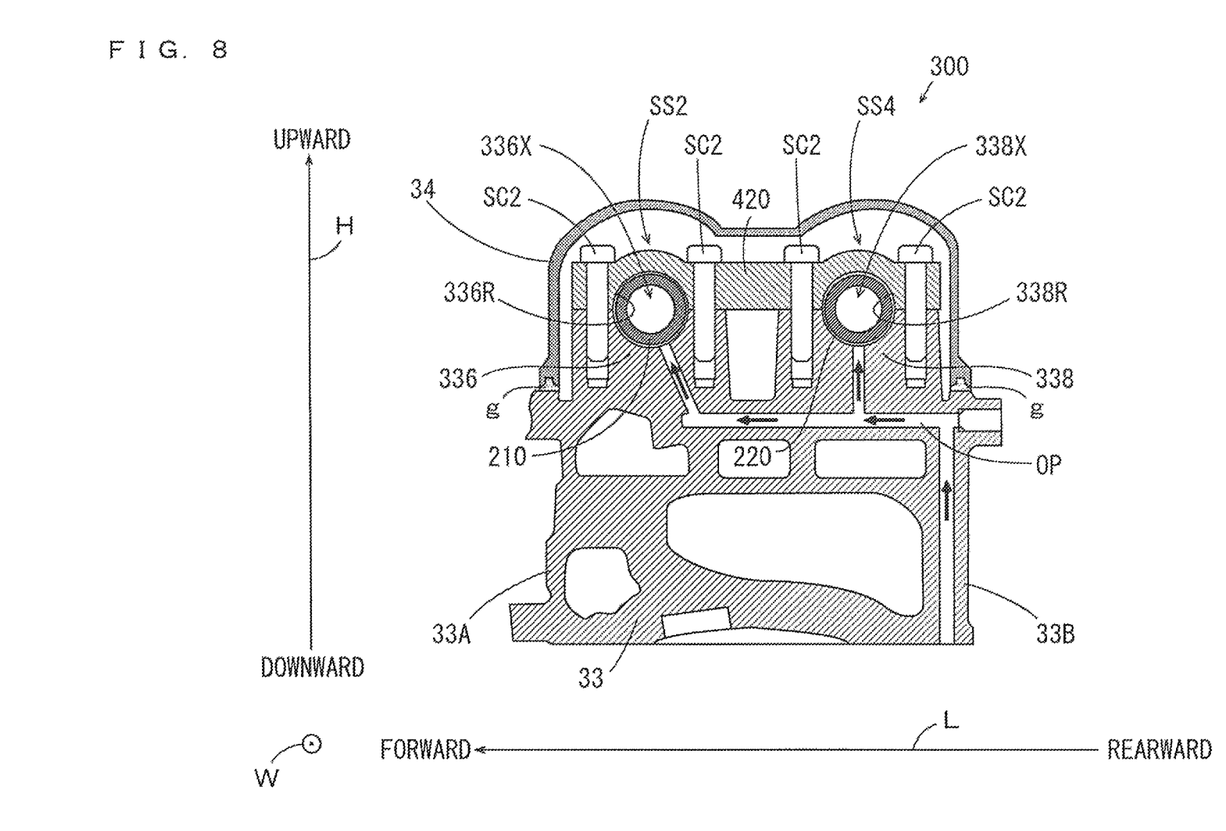
FIG. 8 is a longitudinal cross sectional view of the cylinder taken along the line D-D of FIG. 3.

FIG. 3 is a plan view of the cylinder 300 with the cylinder head cover 34 removed. FIG. 4 is a longitudinal cross-sectional view of the cylinder 300 taken along the line A-A of FIG. 3, and FIG. 5 is a longitudinal cross-sectional view of the cylinder 300 taken along the line B-B of FIG. 3. Further, FIGS. 6 and 7 are longitudinal cross-sectional views of the cylinder 300 taken along the line C-C of FIG. 3, and FIG. 8 is a longitudinal cross-sectional view of the cylinder 300 taken along the line D-D of FIG. 3. In each of FIGS. 3 to 8, the cylinder body 32 of the cylinder 300 is not shown. Further, in FIG. 7, a portion of the constituent elements (the intake cam sprocket 120, the exhaust cam sprocket 130, and a cam chain 290, described below) shown in the longitudinal cross-sectional view of FIG. 6 are not shown.

As shown in FIG. 3, the cylinder head 33 of the present preferred embodiment includes a front wall 33A, a rear wall 33B, a left wall 33C and a right wall 33D. The throttle body connector 6X projects forward and upward from the front wall 33A. In the throttle body connector 6X, the intake port 332 of FIG. 2 opens forward and upward. The exhaust pipe connector 7X projects rearward and slightly rightward from the rear wall 33B. In the exhaust pipe connector 7X, the exhaust port 334 of FIG. 2 opens rearward and rightward.

As indicated by a two-dots and dash line in FIG. 3, the combustion chamber V of FIG. 2 is provided at the center of the lower end of the cylinder head 33. A cam chain chamber 290R is provided to the left of the combustion chamber V to be adjacent to the combustion chamber V. The cam chain chamber 290R is defined by the cylinder body 32 (FIG. 2), the cylinder head 33 and the cylinder head cover 34 (FIG. 2) and extends in the top-and-bottom direction H. An inner space of the cam chain chamber 290R communicates with an inner space of the crankcase 31.

A first shaft support SS1 and a third shaft support SS3 are provided on the cylinder head 33 to be adjacent to the cam chain chamber 290R and extend in the front-and-rear direction L. The first shaft support SS1 is located at a position farther forward than the third shaft support SS3. Further, a second shaft support SS2 and a fourth shaft support SS4 are provided on the cylinder head 33 and extend in the front-and-rear direction L in the vicinity of the right wall 33D. The second shaft support SS2 is located at a position farther forward than the fourth shaft support SS4.

The intake camshaft 210 is provided at a position forward of the cylinder axis SA on the cylinder head 33 and extends in a direction parallel or substantially parallel to the crankshaft 311 of FIG. 2 (the left-and-right direction W). The intake camshaft 210 is rotatably supported by the first shaft support SS1 and the second shaft support SS2. In this state, the left end of the intake camshaft 210 is located inside of the cam chain chamber 290R. The intake cam sprocket 120 is attached to the left end of the intake camshaft 210.

The two intake cams 211A, 211B are integrally provided at the intake camshaft 210 and are spaced apart from each other. The intake cams 211A, 211B are located at positions rightward of the cam chain chamber 290R and between the first shaft support SS1 and the second shaft support SS2. At this time, the intake cam 211A is positioned leftward of the cylinder axis SA, and the intake cam 211B is positioned rightward of the cylinder axis SA.

Further, the exhaust camshaft 220 is provided at a position rearward of the intake camshaft 210 and rearward of the cylinder axis SA on the cylinder head 33 and extends in a direction parallel or substantially parallel to the crankshaft 311 of FIG. 2 (the left-and-right direction W). The exhaust camshaft 220 is rotatably supported by the third shaft support SS3 and the fourth shaft support SS4. In this state, the left end of the exhaust camshaft 220 is located inside of the cam chain chamber 290R. The exhaust cam sprocket 130 is attached to the left end of the exhaust camshaft 220.

The two exhaust cams 221A, 221B are integrally provided at the exhaust camshaft 220 and are spaced apart from each other. The exhaust cams 221A, 221B are located at positions rightward of the cam chain chamber 290R and between the third shaft support SS3 and the fourth shaft support SS4. At this time, the exhaust cam 221A is positioned leftward of the cylinder axis SA, and the exhaust cam 221B is positioned rightward of the cylinder axis SA.

As shown in FIG. 4, the cylinder head 33 includes a joint plane CP where the cylinder head 33 is joined to the cylinder body 32. The joint plane CP is perpendicular or substantially perpendicular to the cylinder axis SA. In the case where a virtual plane VP is defined by the joint plane CP, a distance d1 between a portion p1, closest to the virtual plane VP, of the intake camshaft 210 and the virtual plane VP in the top-and-bottom direction H is less than a distance d2 between a portion p2, farthest from the virtual plane VP, of the intake port 332 and the virtual plane VP in the top-and-bottom direction H. The portion p1, closest to the virtual plane VP, of the intake camshaft 210 is positioned on an outer peripheral surface of each of the intake cams 211a, 211b.

As shown in FIG. 3, the intake cam sprocket 120 and the exhaust cam sprocket 130 provided in the cam chain chamber 290R are located on the same plane (a plane perpendicular or substantially perpendicular to the left-and-right direction W in the present preferred embodiment). Further, the crank sprocket 110 of FIG. 2 is located on the same above-mentioned plane. Further, a gear ratio (a reduction gear ratio) of each of the intake cam sprocket 120 and the exhaust cam sprocket 130 to the crank sprocket 110 is preferably set to 2, for example. For example, in the case where the number of gears of the crank sprocket 110 is set to 16, the number of gears of each of the intake cam sprocket 120 and the exhaust cam sprocket 130 is set to 32.

As shown in FIG. 2, the cam chain 290 is looped over the crank sprocket 110, the intake cam sprocket 120 and the exhaust cam sprocket 130. In FIG. 3, the cam chain 290 is not shown.

As shown in FIG. 6, the cam chain 290 includes a plurality of plate members 291 and a plurality of pins 292 that couple the plurality of plate members 291 to one another. A pitch circle of the intake cam sprocket 120 defined by the cam chain 290 is referred to as a first pitch circle PC1, and a pitch circle of the exhaust cam sprocket 130 defined by the cam chain 290 is referred to as a second pitch circle PC2. The first pitch circle PC1 circumscribes a pitch line connecting portions, engaging with the intake cam sprocket 120, of the cam chain 290 to one another (a line connecting the plurality of pins 292 to one another). Further, the second pitch circle PC2 circumscribes a pitch line connecting portions, engaging with the exhaust cam sprocket 130, of the cam chain 290 to one another (a line connecting the plurality of pins 292 to one another).

The intake cam sprocket 120 and the exhaust cam sprocket 130 are located such that the first pitch circle PC1 and the second pitch circle PC2 intersect with each other, and the intake cam sprocket 120 and the exhaust cam sprocket 130 are located such that the gears of the intake cam sprocket 120 and the gears of the exhaust cam sprocket 130 do not interfere with each other.

As shown in FIG. 4, a plug attachment 33M and a pipe attachment 33N are provided in the center portion of the cylinder head 33 to penetrate in the top-and-bottom direction H. The plug attachment 33M includes a threaded through hole and extends a constant distance upward from the upper end of the combustion chamber V. The pipe attachment 33N includes a through hole having an inner diameter larger than the through hole of the plug attachment 33M and extends farther upward from the upper end of the plug attachment 33M. One end of a steel guide pipe 35 is pushed into the pipe attachment 33N. Thus, the one end of the guide pipe 35 is held in the pipe attachment 33N, and is fixed to the cylinder head 33. A liquid gasket g1 is provided between an outer peripheral surface of the one end of the guide pipe 35 and an inner peripheral surface of the through hole of the pipe attachment 33N.

With the one end of the guide pipe 35 being fixed to the cylinder head 33, the cylinder head cover 34 is connected to the cylinder head 33 via a sheet-shaped gasket g.

A pipe fixing portion 34P and a plug unit insert 34Q are provided at the center of the upper end of the cylinder head cover 34. The pipe fixing portion 34P is preferably an annular step provided at the inner surface of the upper end of the cylinder head cover 34 so as to correspond to the other end of the guide pipe 35. The plug unit insert 34Q includes a through hole extending upward from an inner edge of the pipe fixing portion 34P, and is configured such that an ignition plug 231 and a plug cap 232, described below, are able to be inserted.

The cylinder head cover 34 is connected to the cylinder head 33 so that the other end of the guide pipe 35 is fixed to the step of the pipe fixing portion 34P. A gasket g2 is provided between an outer peripheral surface of the other end of the guide pipe 35 and the pipe fixing portion 34P. In this state, an inner space of the guide pipe 35 and a space above the cylinder head cover 34 communicate with each other through the through hole of the plug unit insert 34Q. An O-ring, for example, may be used as the above-mentioned gasket g2.

The ignition plug 231 is attached to the plug attachment 33M of the cylinder head cover 34 through inner spaces of the plug unit insert 34Q and the guide pipe 35. Further, the plug cap 232 is connected to the upper end of the ignition plug 231. The ignition plug unit 230 is defined by the ignition plug 231 and the plug cap 232.

The guide pipe 35 and the ignition plug unit 230 are located between the intake camshaft 210 and the exhaust camshaft 220 and extend parallel or substantially parallel to the cylinder axis SA. As shown in FIG. 3, each of the guide pipe 35 and the ignition plug unit 230 extends through a position inward of the intake cams 211A, 211B and the exhaust cams 221A, 221B with the cylinder axis SA defining a reference position. In other words, each of the guide pipe 35 and the ignition plug unit 230 extends to a position surrounded by the intake cams 211A, 211B and the exhaust cams 221A, 221B from the combustion chamber V as indicated by a thick dotted line in FIG. 3.

As shown in FIG. 5, in the cylinder head 33, the intake valve 212A is capable of opening and closing the intake opening 331A of the intake port 332, and the exhaust valve 222A is capable of opening and closing the exhaust opening 333A of the exhaust port 334. The valve lifter (a tappet) 213A is provided at the upper end (a stem end) of the intake valve 212A together with the valve spring 214A. The valve lifter (a tappet) 223A is provided at the upper end (a stem end) of the exhaust valve 222A together with the valve spring 224A.

The intake cam 211A is positioned on an extension line of a center axis of the intake valve 212A, and is located such that at least a portion of the outer peripheral surface of the intake cam 211A is able to come into contact with the upper surface (a sliding surface) of the valve lifter 213A. When the intake cam 211A rotates, the outer peripheral surface of the intake cam 211A slides on the upper surface of the valve lifter 213A. Thus, the intake valve 212A moves in the axial direction, and the opening and closing operations of the intake opening 331A are performed. In this manner, the intake valve 212A is driven by the direct-type intake cam 211A.

The exhaust cam 221A is positioned on an extension line of a center axis of the exhaust valve 222A, and is located such that at least a portion of the outer peripheral surface of the exhaust cam 221A is able to come into contact with the upper surface (a sliding surface) of the valve lifter 223A. When the exhaust cam 221A rotates, the outer peripheral surface of the exhaust cam 221A slides on the upper surface of the valve lifter 223A. Thus, the exhaust valve 222A moves in the axial direction, and the opening and closing operations of the exhaust opening 333A are performed. In this manner, the exhaust valve 222A is driven by the direct-type exhaust cam 221A.

As indicated by brackets in FIG. 2, in the cylinder head 33, the intake valve 212B is capable of closing and opening the intake opening 331B of the intake port 332 in addition to the above-mentioned intake valve 212A and exhaust valve 222A. Further, the exhaust valve 222B is capable of opening and closing the exhaust opening 333B of the exhaust port 334. The valve lifter (the tappet) 213B is provided at the upper end (a stem end) of the intake valve 212B together with the valve spring 214B. The valve lifter (a tappet) 223B is provided at the upper end (a stem end) of the exhaust valve 222B together with the valve spring 224B. The intake valve 212B and the exhaust valve 222B are respectively driven by the direct-type intake cam 211B and exhaust cam 221B similarly to the intake valve 212A and the exhaust valve 222A of FIG. 5.

As shown in FIG. 7, a first base 335 and a third base 337 are provided at upper portions of the cylinder head 33 facing the cam chain chamber 290R and extend in the front-and-rear direction L. The first base 335 is located at a position farther forward than the third base 337. The first base 335 and the third base 337 respectively project upward of the upper ends of the front wall 33A and the rear wall 33B in the top-and-bottom direction H.

A first fixing member 410 extending in the front-and-rear direction L is attached to upper portions of the first base 335 and the third base 337 by a plurality (preferably three in the present example) of screws SC1. The three screws SC1 are spaced apart in the front-and-rear direction L at positions leftward of the intake cams 211A, 211B (FIG. 3) and the exhaust cams 221A, 221B (FIG. 3).

The first shaft support SS1 is defined by the first base 335 and a front half of the first fixing member 410. In the first shaft support SS1, a circular opening 335X that connects left and right spaces of the first shaft support SS1 to each other is provided. A portion of the intake camshaft 210 (a portion in the vicinity of the left end of the intake camshaft 210) is rotatably supported at an inner peripheral surface 335R of the opening 335X via a bearing BR. Further, the third shaft support SS3 is defined by the third base 337 and a rear half of the first fixing member 410. In the third shaft support SS3, a circular opening 337X that connects left and right spaces of the third shaft support SS3 to each other is provided. A portion of the exhaust camshaft 220 (a portion in the vicinity of the left end of the exhaust camshaft 220) is rotatably supported at an inner peripheral surface 337R of the opening 337X via a bearing BR. In the cylinder 300, an oil flow path (not shown) that delivers oil to the first shaft support SS1 and the third shaft support SS3 is provided.

As shown in FIG. 8, a second base 336 and a fourth base 338 are provided at upper portions of the cylinder head 33 in the vicinity of the right wall 33D of FIG. 3 and are spaced apart in the front-and-rear direction L. The second base 336 is located at a position farther forward than the fourth base 338. The second base 336 and the fourth base 338 respectively project upward of the upper ends of the front wall 33A and the rear wall 33B in the top-and-bottom direction H.

A second fixing member 420 extending in the front-and-rear direction L is attached to upper portions of the second base 336 and the fourth base 338 by a plurality (four in the present example) screws SC2. The four screws SC2 are spaced apart in the front-and-rear direction L at positions rightward of the intake cams 211A, 211B (FIG. 3) and the exhaust cams 221A, 221B (FIG. 3).

The second shaft support SS2 is defined by the second base 336 and a front half of the second fixing member 420. In the second shaft support SS2, a circular opening 336X that connects left and right spaces of the second shaft support SS2 to each other is provided. The right end of the intake camshaft 210 is rotatably supported at an inner peripheral surface 336R of the opening 336X. Further, the fourth shaft support SS4 is defined by the fourth base 338 and a rear half of the second fixing member 420. In the fourth shaft support SS4, a circular opening 338X that connects left and right spaces of the fourth shaft support SS4 to each other is provided. The right end of the exhaust camshaft 220 is rotatably supported at an inner peripheral surface 338R of the opening 338X.

The oil flow path OP that delivers oil to the inner peripheral surfaces 336R, 338R of the second shaft support SS2 and the fourth shaft support SS4 is provided in the cylinder head 33. In FIG. 8, a flow of oil in the oil flow path OP is indicated by thick solid arrows.

As shown by thick solid arrows in FIG. 2, during an operation of the engine 3, the piston 313 moves upward and downward in the cylinder S, and the crankshaft 311 rotates. The rotational force of the crankshaft 311 is transmitted to the intake camshaft 210 via the crank sprocket 110, the cam chain 290 and the intake cam sprocket 120. Further, the rotational force of the crankshaft 311 is transmitted to the exhaust camshaft 220 via the crank sprocket 110, the cam chain 290 and the exhaust cam sprocket 130. Thus, the intake cams 211A, 211B and the exhaust cams 221A, 221B rotate, so that the intake valves 212A, 212B and the exhaust valves 222A, 222B open and close the intake openings 331A, 331B and the exhaust openings 333A, 333B.

The intake valves 212A, 212B open the intake openings 331A, 331B so that a fuel-air mixture is delivered to the combustion chamber V. Further, the fuel-air mixture delivered to the combustion chamber V is combusted by an ignition operation of the ignition plug 231. Further, the exhaust valves 222A, 222B open the exhaust openings 333A, 333B so that the combusted gas is exhausted from the combustion chamber V.

In the engine 3, the first shaft support SS1 is positioned leftward of the intake cams 211A, 211B on the intake camshaft 210, and the second shaft support SS2 is positioned rightward of the intake cams 211A, 211b on the intake camshaft 210. That is, the first shaft support SS1 and the second shaft support SS2 sandwich the intake cams 211A, 211B in the left-and-right direction W.

Further, the third shaft support SS3 is positioned leftward of the exhaust cams 221A, 221B on the exhaust camshaft 220, and the fourth shaft support SS4 is positioned rightward of the exhaust cams 221A, 221B on the exhaust camshaft 220. That is, the third shaft support SS3 and the fourth shaft support SS4 sandwich the exhaust cams 221A, 221B in the left-and-right direction W.

Therefore, the first to fourth shaft supports SS1 to SS4 are not present at positions inward of the intake cams 211A, 211B and the exhaust cams 221A, 221B, with the cylinder axis SA defining a reference position. Further, the plurality of screws SC1, SC2 to fix the intake camshaft 210 and the exhaust camshaft 220 are not present at positions inward of the intake cams 211A, 211B and the exhaust cams 221A, 221B, with the cylinder axis SA defining a reference position.

On the other hand, the ignition plug unit 230 and the guide pipe 35 extend through positions inward of the intake cams 211A, 211B and the exhaust cams 221A, 221B with the cylinder axis SA defining a reference position. Thus, the first to fourth shaft supports SS1 to SS4 and the plurality of screws SC1, SC2 do not interfere with the ignition plug unit 230 and the guide pipe 35 between the intake camshaft 210 and the exhaust camshaft 220.

Therefore, a distance between the intake camshaft 210 and the exhaust camshaft 220 is sufficiently reduced such that the first pitch circle PC1 and the second pitch circle PC2 intersect with each other, and is sufficiently reduced such that the gears of the intake cam sprocket 120 and the gears of the exhaust cam sprocket 130 do not interfere with each other. As a result, the size of the cylinder head 33 is reduced in the front-and-rear direction L that intersects with the cylinder axis SA.

Because the intake cams 211*a*, 211*b* and the exhaust cams 221*a*, 221*b* are direct-type cams, it is possible to reduce a distance between the upper end of the intake valve 212*a* and the upper end of the exhaust valve 222*a* by reducing a distance between the intake camshaft 210 and the exhaust camshaft 220. Further, a distance between the upper end of the intake valve 212*b* and the upper end of the exhaust valve 222*b* is reduced. Thus, a valve included angle (an angle between the intake valve 212*a* and the exhaust valve 222*a*, and an angle between the intake valve 212*b* and the exhaust valve 222*b*) θ shown in FIG. 5 is reduced.

In this case, the valve lifters 213*a*, 213*b*, 223*a*, 223*b* and the valve springs 214*a*, 214*b*, 224*a*, 224*b* that respectively drive the intake valves 212*a*, 212*b* and the exhaust valves 222*a*, 222*b* are located closer to the cylinder axis SA.

In the cylinder head 33, the intake port 332 extends obliquely forward such that the distance between the portions of the intake and exhaust ports 332, 334, which are at the same distance from the combustion chamber V in the direction of the cylinder axis SA, gradually increases as the distance between the combustion chamber V and the portion of the intake port 332 increases in the direction of the cylinder axis SA. Therefore, in the vicinity of the cylinder axis SA, the valve lifters 213*a*, 213*b* and the valve springs 214*a*, 214*b* provided at the upper ends of the intake valves 212*a*, 212*b* are unlikely to interfere with the intake port 332. Therefore, the valve lifters 213*a*, 213*b* and the valve springs 214*a*, 214*b* are located closer to the virtual plane VP including the joint plane CP of the cylinder head 33. Further, the exhaust port 334 extends obliquely rearward such that the distance between the portions of the intake and exhaust ports 332, 334, which are at the same distance from the combustion chamber V in the direction of the cylinder axis SA, gradually increases as the distance between the combustion chamber V and the portion of the exhaust port 334 increases in the direction of the cylinder axis SA. Therefore, in the vicinity of the cylinder axis SA, the valve lifters 223*a*, 223*b* and the valve springs 224*a*, 224*b* provided at the upper ends of the exhaust valves 222*a*, 222*b* are unlikely to interfere with the exhaust port 334. Therefore, the valve lifters 223*a*, 223*b* and the valve springs 224*a*, 224*b* are located closer to the virtual plane VP. As a result, the size of the cylinder head 33 is reduced in the top-and-bottom direction H parallel or substantially parallel to the cylinder axis SA to a degree where the distance d1 between the portion p1, closest to the virtual plane VP, of the intake camshaft 210 and the virtual plane VP is less than the distance d2 between the portion p2, farthest from the virtual plane VP, of the intake port 332 and the virtual plane VP.

Further, in the above-mentioned configuration, because the crank sprocket 110, the intake cam sprocket 120 and the exhaust cam sprocket 130 are located on the same plane, the common cam chain 290 is looped over the crank sprocket 110, the intake cam sprocket 120 and the exhaust cam sprocket 130. In this case, it is not necessary to prepare a plurality of cam chains in order to rotate the intake cam sprocket 120 and the exhaust cam sprocket 130. Thus, an increase in weight is prevented.

Further, in the above-mentioned configuration, because the intake cams 211*a*, 211*b* are located between the first shaft support SS1 and the second shaft support SS2, the intake camshaft 210 is stably held by the first and second shaft supports SS1, SS2 during the rotation of the intake camshaft 210. Similarly, because the exhaust cams 221*a*, 221*b* are located between the third shaft support SS3 and the fourth shaft support SS4, the exhaust camshaft 220 is stably held by the third and fourth shaft supports SS3, SS4 during the rotation of the exhaust camshaft 220.

In the present preferred embodiment, the valve included angle θ is preferably set to about 0° or more, for example, and about 18° or less, for example. Thus, the size of the cylinder head 33 is reduced in the front-and-rear direction L and the top-and-bottom direction H.

As shown in FIG. 4, the guide pipe 35 is provided inside of the cylinder head 33 and the cylinder head cover 34 in order to protect the ignition plug unit 230 from the oil supplied to the intake camshaft 210, the exhaust camshaft 220, the cam chain 290 and the like.

The one end of the guide pipe 35 is held inside of the pipe attachment 33N of the cylinder head 33, and the other end of the guide pipe 35 is held by the pipe fixing portion 34P of the cylinder head cover 34. The liquid gasket g1 is provided between the outer peripheral surface of the one end of the guide pipe 35 and the inner peripheral surface of the pipe attachment 33N, and the gasket g2 is provided between the outer peripheral surface of the other end of the guide pipe 35 and the pipe fixing portion 34P of the cylinder head cover 34.

In this case, the inner space of the guide pipe 35 is shielded from the outside of the guide pipe 35, that is, an oil supply space inside of the cylinder 300 by the liquid gasket g1 and the gasket g2. Thus, the oil is prevented from entering the guide pipe 35 regardless of the thickness of the guide pipe 35. Therefore, the thickness of the guide pipe 35 is reduced, such that the ignition plug unit 230 is able to be inserted into the guide pipe 35 while the distance between the intake camshaft 210 and the exhaust camshaft 220 is reduced. Thus, it is possible to reduce the size of the cylinder 300 while protecting the ignition plug unit 230 from the oil with a simple configuration.

While the valve included angle θ is preferably set to about 0° or more and preferably about 18° or less in the above-mentioned preferred embodiments, for example, the present invention is not limited to this. The valve included angle θ may be larger than about 18°. In this case, a lift amount of each of the intake valves 212*a*, 212*b* and the exhaust valves 222*a*, 222*b* is increased.

While the right ends of the intake camshaft 210 and the exhaust camshaft 220 are preferably rotatably supported by the second shaft support SS2 and the fourth shaft support SS4 in the above-mentioned preferred embodiments, the present invention is not limited to this. The right ends of the intake camshaft 210 and the exhaust camshaft 220 may be supported by the second shaft support SS2 and the fourth shaft support SS4 via bearings. In this case, the intake camshaft 210 and the exhaust camshaft 220 rotate more smoothly.

While the first fixing member 410, the second fixing member 420 and the cylinder head cover 34 are respectively and separately provided in the above-mentioned preferred embodiments, the present invention is not limited to this. Two or more among the first fixing member 410, the second fixing member 420 and the cylinder head cover 34 may be integral. In this case, the assembly work of the cylinder portion 300 is simplified.

In the above-mentioned preferred embodiments, the virtual plane VP defining a positional relationship between the intake camshaft 210 and the intake port 332 includes the joint plane CP of the cylinder head 33. The virtual plane VP only has to be perpendicular or substantially perpendicular to the cylinder axis SA and positioned at a position closer to the cylinder body 32 than the intake camshaft 210 in the direction of the cylinder axis SA, and does not have to include the joint plane CP of the cylinder head 33.

While the above-mentioned preferred embodiments are preferably applied to a motorcycle, the present invention is not limited to this. Preferred embodiments of the present invention may be applied to another straddled vehicle such as a motor tricycle, an ATV (All Terrain Vehicle) or the like.

In the following paragraphs, non-limiting examples of correspondences between various elements recited in the claims below and those described above with respect to various preferred embodiments of the present invention are explained.

In the above-mentioned preferred embodiments, the cylinder body 32 is an example of a cylinder body, the intake port 332 is an example of an intake port, the exhaust port 334 is an example of an exhaust port, the cylinder head 33 is an example of a cylinder head, the intake valves 212a, 212b are examples of first and second intake valves, and the exhaust valves 222a, 222b are examples of first and second exhaust valves.

Further, the intake camshaft 210 is an example of an intake camshaft, the intake cams 211a, 211b are examples of first and second cams, the exhaust camshaft 220 is an example of an exhaust camshaft, and the exhaust cams 221a, 221b are examples of third and fourth cams.

Further, the first shaft support SS1 is an example of a first shaft support, the second shaft support SS2 is an example of a second shaft support, the third shaft support SS3 is an example of a third shaft support, the fourth shaft support SS4 is an example of a fourth shaft support, the intake cam sprocket 120 is an example of a first sprocket, and the exhaust cam sprocket 130 is an example of a second sprocket.

Further, the cam chain 290 is an example of a cam chain, the ignition plug unit 230 is an example of an ignition plug unit, the cylinder axis SA is an example of a cylinder axis, the combustion chamber V is an example of a combustion chamber, the joint plane CP of the cylinder head 33 is an example of a joint plane, the virtual plane VP is an example of a virtual plane, the first pitch circle PC1 is an example of a first pitch circle, the second pitch circle PC2 is an example of a second pitch circle, and the engine 3 is an example of an engine.

Further, the valve lifters 213a, 213b, 223a, 223b are examples of a valve lifter, the valve springs 214a, 214b, 224a, 224b are examples of a valve spring, the valve included angle θ is an example of a valve included angle between the first intake valve and the first exhaust valve and a valve included angle between the second intake valve and the second exhaust valve.

Further, the cylinder head cover 34 is an example of a cylinder head cover, the guide pipe 35 is an example of a guide pipe, the ignition plug 231 is an example of an ignition plug, the plug cap 232 is an example of a plug cap, and the through holes of the plug attachment 33M and the pipe attachment 33N are examples of a through hole connected to a combustion chamber.

Further, the liquid gasket g1 is an example of a first seal, the gasket g2 is an example of a second seal, the plurality of screws SC1, SC2 are examples of a plurality of fixtures, the rear wheel 23 is an example of a drive wheel, and the motorcycle 100 is an example of a straddled vehicle.

Preferred embodiments of the present invention can be effectively utilized for engines required to generate a high rotation speed and a high output, and various types of vehicles or the like that include the engines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine comprising:
   a cylinder body;
   a cylinder head including an intake port and an exhaust port and that is joined to the cylinder body;
   a first intake valve and a second intake valve in the cylinder head that open and close the intake port;
   a first exhaust valve and a second exhaust valve in the cylinder head that open and close the exhaust port;
   an intake camshaft including a first cam and a second cam that respectively drive the first intake valve and the second intake valve and that is provided at the cylinder head;
   an exhaust camshaft including a third cam and a fourth cam that respectively drive the first exhaust valve and the second exhaust valve and that is provided at the cylinder head;
   a first shaft support and a second shaft support that rotatably support the intake camshaft;
   a third shaft support and a fourth shaft support that rotatably support the exhaust camshaft;
   a first sprocket provided at the intake camshaft;
   a second sprocket provided at the exhaust camshaft;
   a cam chain looped over the first and second sprockets; and
   an ignition plug unit provided in the cylinder head; wherein
   the intake port extends obliquely outward such that a distance between a portion of the intake port and a portion of the exhaust port, which are located at a same distance from a combustion chamber in a direction of a cylinder axis, gradually increases as a distance between the combustion chamber and the portion of the intake port increases in the direction of the cylinder axis;
   the exhaust port extends obliquely outward such that a distance between the portion of the intake port and the portion of the exhaust port, which are located at a same distance from the combustion chamber in the direction of the cylinder axis, gradually increases as a distance between the combustion chamber and the portion of the exhaust port increases in the direction of the cylinder axis;
   the first cam and the second cam are located between the first shaft support and the second shaft support;
   the third cam and the fourth cam are located between the third shaft support and the fourth shaft support;
   the ignition plug unit extends through a position located between the intake camshaft and the exhaust camshaft and inward of the first, second, third, and fourth cams with the cylinder axis defining a reference position;
   the first and second sprockets are located on a same plane such that a first pitch circle of the first sprocket defined by the cam chain and a second pitch circle of the second sprocket defined by the cam chain intersect with each other, and such that gears of the first sprocket and gears of the second sprocket do not interfere with each other;
   a virtual plane is defined by a joint plane between the cylinder head and the cylinder body; and
   a distance between a portion, closest to the virtual plane, of the intake camshaft and the virtual plane is less than a distance between a portion, farthest from the virtual plane, of the intake port and the virtual plane.

2. The engine according to claim 1, further comprising a valve lifter and a valve spring provided at each of the first intake valve, the second intake valve, the first exhaust valve, and the second exhaust valve.

3. The engine according to claim 2, wherein a valve included angle between the first intake valve and the first exhaust valve and a valve included angle between the second intake valve and the second exhaust valve are about 18° or less.

4. The engine according to claim 1, further comprising:
   a cylinder head cover attached to the cylinder head; and a guide pipe; wherein the ignition plug unit includes an ignition plug and a plug cap connected to the ignition plug;

a portion of the ignition plug and the plug cap are inserted into the guide pipe;

the cylinder head includes a through hole connected to the combustion chamber;

a first end of the guide pipe is held in the through hole, and a second end of the guide pipe is held by the cylinder head cover;

a first seal is located between an outer peripheral surface of the first end of the guide pipe and an inner peripheral surface of the through hole;

a second seal is located between an outer peripheral surface of the second end of the guide pipe and the cylinder head cover; and the guide pipe extends to a position surrounded by the first cam, the second cam, the third cam, and the fourth cam from the through hole.

5. The engine according to claim 1, further comprising a plurality of fixtures that fix the first shaft support to the second shaft support to support the intake cam shaft, and that fix the third shaft support to the fourth shaft support to support the exhaust camshaft; wherein the plurality of fixtures are located outward of positions surrounded by the first cam, the second cam, the third cam, and the fourth cam.

6. A straddled vehicle comprising:

a drive wheel; and the engine according to claim 1 that generates motive power to rotate the drive wheel.

\* \* \* \* \*